United States Patent [19]
Kobayashi

[11] Patent Number: 5,092,703
[45] Date of Patent: Mar. 3, 1992

[54] BALL JOINT AND METHOD OF MANUFACTURING THE SAME

[75] Inventor: Toru Kobayashi, Yokohama, Japan

[73] Assignee: Yorozu Manufacturing Corporation, Kanagawa, Japan

[21] Appl. No.: 496,450

[22] Filed: Mar. 20, 1990

[30] Foreign Application Priority Data

| Mar. 22, 1989 | [JP] | Japan | 1-67535 |
| Oct. 16, 1989 | [JP] | Japan | 1-120761[U] |
| Oct. 16, 1989 | [JP] | Japan | 1-120763[U] |
| Oct. 16, 1989 | [JP] | Japan | 1-268684 |

[51] Int. Cl.$^5$ .................. F16C 11/00; F16D 1/12; G05G 1/00
[52] U.S. Cl. .................. 403/122; 403/76; 74/579 R
[58] Field of Search .............. 403/76, 122; 74/502.4, 74/579 R, 579 F

[56] References Cited

U.S. PATENT DOCUMENTS

| 3,762,824 | 10/1973 | Kleinschmit et al. | 403/76 |
| 4,220,418 | 9/1980 | Kondo et al. | 403/76 |
| 4,230,415 | 10/1980 | Scheerer | 403/122 |
| 4,291,552 | 9/1981 | Orain | 403/76 X |
| 4,536,003 | 8/1985 | Maurer et al. | 74/579 R X |
| 4,645,370 | 2/1987 | Kassai | 74/579 R X |
| 4,679,958 | 7/1987 | Mizusawa et al. | 403/122 X |
| 4,712,940 | 12/1987 | Wood | 403/122 X |
| 4,758,110 | 7/1988 | Ito | 403/122 X |
| 4,902,157 | 2/1990 | Ishikawa et al. | 403/76 X |
| 4,916,788 | 4/1980 | Mitoya | 403/122 X |

FOREIGN PATENT DOCUMENTS

| 0027770 | 4/1981 | European Pat. Off. |  |
| 3527870 | 2/1986 | Fed. Rep. of Germany | 403/76 |
| 0006911 | 1/1981 | Japan | 403/122 |
| 221445 | 9/1983 | Japan | 74/579 R |
| 62-41925 | 3/1987 | Japan . |  |
| 62-75217 | 5/1987 | Japan . |  |
| 0130911 | 6/1988 | Japan | 403/122 |
| 2100337 | 12/1982 | United Kingdom | 403/122 |
| 2106173 | 4/1983 | United Kingdom | 403/122 |
| 2142082 | 1/1985 | United Kingdom | 403/122 |

*Primary Examiner*—Vinh T. Luong
*Attorney, Agent, or Firm*—Mathews, Woodbridge & Collins

[57] ABSTRACT

A ball joint including a housing having two inner chambers in which spherical head portions of ball studs are housed so that the ball studs are swingable, and ball seats interposed between the spherical head portions and the inner chamber walls. The housing is integrally formed of a synthetic resin.

The cross-sectional centroid of a central portion of the housing and the cross-sectional centroid of a portion of the housing in the vicinity of each inner chamber are set on the opposite sides of a axial line connecting the two spherical head portions.

Annular recesses are formed in the outer circumferential surfaces of the housing, and end flanges of dust covers each having an extreme end portion smaller in contact area in comparison with its base end are engaged with the annular recesses.

14 Claims, 8 Drawing Sheets

(A)

(B)

BALL JOINT AND METHOD OF MANUFACTURING THE SAME

BACKGROUND OF THE INVENTION

1. Field of the Invention

This invention relates to a ball joint having a housing integrally formed of a synthetic resin and to a method of manufacturing this ball joint.

2. Description of the Prior Art

Ordinarily, a ball joint is constitutes by a ball stud and a housing. A spherical head portion of the ball stud housed in a spherical inner chamber formed in the housing, while a shaft portion of the ball stud is movably projects outward through an opening of the housing. Ball joints of this construction are widely used for vehicle suspensions or adapted for other kinds of use.

Ball joints of this construction entail a problem in that the inside diameter of the opening of the housing must be smaller than the outside diameter of the spherical head portion of the ball stud, and it is possible that the ball stud cannot be inserted or, conversely, it will come off the housing, unless these members are manufactured with the desired control of the relationship between their sizes.

Conventional ball joints are disadvantageous in terms of weight and the problem of rust because they are formed of metals. For this reason, the development of resin-made housings has recently been promoted; ball joints in which the housing constitutes by an assembly of separate synthetic resin parts or is integrally formed of a synthetic resin have already been developed.

For example, Japanese Utility Model Laid-Open No. 62-41,925 discloses a ball joint having a construction such that a spherical head portion of a ball stud is inserted in an inner chamber of a housing integrally formed of a synthetic resin, and an opening portion of the inner chamber and a dust cover are fastened together by a fastening ring. In this publication, it is stated that, for setting the relationship between the inside diameter d of the opening and the inside diameter D of the inner chamber, the most suitable value of $(D-d)/D$ is 0.05 to 0.1.

In conventional ball joints, a dust cover is mounted between the shaft portion of the ball stud and the housing in order to prevent water, dust and the like from entering the gap between the slide surfaces of the housing and the spherical head portion of the ball stud through the opening, and to thereby prevent the ball stud from rusting as well as to maintain the smoothness of the flexing motion.

Conventional ball joints formed of synthetic resins, however, entail various problems relating to coming-off of the ball stud, the rigidity of the housing, the durability and the manufacturing cost of the ball joint, and the sealing properties and the attachment of the dust cover, and so on.

In the case of the ball joint disclosed in the above publication, as explained in the specification thereof, the mold releasability of the molding is so reduced as to cause a risk of deformation or breakage of the housing if the value of $(D-d)/D$ is 0.1 is larger, or there is a risk of the ball stud coming off the housing if this value is 0.05 or smaller.

A type of ball joint, such as the one disclosed in Japanese Utility Model Laid-Open No. 62-75,217, is known in which the housing consisting of two separate parts is attached to the spherical head of the ball stud with an elastic ring. This ball joint also entails the problem of deterioration of the durability and the problem of an increase in the number of parts.

In regard to the dust cover, the use of a metallic ring or the like for fastening the dust cover and the housing increases the number of parts, which is also disadvantageous in terms of cost.

Fastening with a metallic ring is advantageous in terms of prevention of coming-off of the dust cover but entails a drawback because the use of the metallic ring makes the attachment operation difficult.

The following problem is encountered with respect to the rigidity of the housing. In a ball joint assembly consisting of two conventional ball joints with a synthetic resin housing, it is difficult to align the centers of the spherical head portions of the ball studs and the cross-sectional centroid of a housing rod portion which connects the two inner chambers, because dust covers are fastened to the outer circumferences of the opening portions of the housing. This will be explained below with respect to a ball joint assembly shown in FIG. 20. It is necessary to form annular recesses in the opening outer circumference portions of the housing 101, with which recesses the lower end flanges of dust covers 109 are engaged. The cross-sectional centroid 129 of the boundaries between the rod portion 132 and the portions in which ball studs 102 are housed (hereinafter referred to as socket portions 131 of the housing) is necessarily set below an axial line 130 connecting the two spherical portions, as viewed in FIG. 20. Consequently, if the shaft portions of the two ball studs 102 are pulled in the directions of the arrows as shown in FIG. 20, this tensile force is applied along the axial line 130 connecting the spherical portions and causes bending of the housing 101 alone, as indicated by the double-dot-dash line, since the cross-sectional centroid 129 of the rod portion 132 does not coincide with the axial line 130. In this event, therefore, there is a risk of each ball stud 102 coming off the inner chamber.

SUMMARY OF THE INVENTION

In view of these problems of the conventional art, a first object of the present invention to provide a ball joint having a large coming-off load, improved in producibility and advantageous in terms of cost.

To achieve this object, according to a present invention, there is provided a ball joint including a ball stud having spherical head portion formed on its one end, a ball seat formed of a synthetic resin, wrapping round the outer periphery of the spherical head portion and slidable on the same, and a housing formed of a synthetic resin and having an inner chamber having a shape corresponding to the outer peripheral surface of the ball seat, the ball seat being fixed in the housing.

Preferably, in this arrangement, an engagement means capable of abutting against a member such as a mold part fixed relative to the ball stud is formed on the ball seat.

To achieve the above object, according to the present invention, there is also provided a method of manufacturing a ball joint, comprising the steps of: loosely fitting a ball seat formed of a synthetic resin to a spherical head portion formed on one end of a ball stud; setting the ball stud in a predetermined position inside resin molding dies: and integrally forming, from a synthetic resin, a housing having an opening such that a shaft portion formed on the other end of the ball stud is swingable.

In accordance with this method and the ball joint having the above-described construction, the thickness of the ball seat is previously selected, the ball seat formed of a synthetic resin material is loosely fitted around the spherical head portion of the ball stud, and the ball stud to which the ball seat is attached is set in the dies, thereby enabling the housing to be integrally formed by insert molding. During molding of the housing, the ball seat can be contracted by being compressed by the synthetic resin for forming the housing so as to have a shape corresponding to the outer peripheral surface of the spherical head portion, and can be fixed by the synthetic resin forming the housing, thereby setting the optimum torque of swinging of the ball stud. The facility with which the ball stud is attached is remarkably improved in accordance with the above-described insert molding process, and the desired coming-off load can be set by selecting the housing opening diameter to prevent the ball stud from coming off. Consequently, it is possible to obtain a ball joint with improved coming-off load as well as in the facility of assembly.

If an engagement means capable of abutting against a member such as a mold part fixed relative to the ball stud, is formed on the ball seat, the engagement means formed on the ball seat abuts against the die at the time of insert molding to fix the ball seat, thereby preventing the ball seat from being shifted from the correct position. After the insert molding, the engagement means formed on the ball seat engages with the synthetic resin forming the housing, thereby fixing the ball seat to the housing more firmly.

An object of the present invention is to provide a ball joint having an improved mechanical strength.

To achieve this object, according to the present invention, there is provided a ball joint including: a pair of ball studs each having a spherical head portion formed at its one end and a shaft portion formed at the other end; a housing formed of a synthetic resin and having inner chambers spaced apart from each other by a predetermined distance, the ball studs being housed in the inner chambers so that the shaft portions are swingable: and dust covers attached between the housing and the shaft portions; wherein the cross-sectional centroid of the central portion of the housing is positioned on the side of the shaft portions of the ball studs with respect to an axial line connecting the two spherical head portions, while the cross-sectional centroid of the portion of the housing in the vicinity of each of the inner chambers is positioned on the side remote from the cross-sectional centroid of the central portion of the housing with respect to the axial line connecting the two spherical head portions.

If, in the ball joint of this construction, a tensile force is applied in the direction of the of the axial line connecting the spherical head portions of the ball stud, the direction of a bending moment acting on the central portion of the housing and the direction of another bending moment acting on the portion of the housing in the vicinity of each inner chamber are opposite to each other, and all bending moments acting on the housing are therefore balanced, thereby preventing bending of the housing.

A third object of the present invention is to provide a ball joint improved in the facility with which the dust cover is attached, and also improved in sealing properties.

To achieve this object, according to the present invention, there is provided a ball joint including: a ball stud having a spherical head portion formed at its one end and a shaft portion formed at the other end; a housing having an inner chamber in which the ball stud is housed so that the shaft portion is swingable: and a dust cover attached between the housing and the shaft portion, the dust cover being formed of an elastic material; wherein a ball seat formed of a synthetic resin is provided between the spherical head portion and the housing so as to wrap round the outer periphery of the spherical head portion head to be slidable thereon, an annular recess is formed in an outer circumferential surface of the housing, and an end flange of the dust cover is brought into engagement with the annular recess, the end flange having a shape such that the contact area of its extreme end portion is reduced in comparison with its base portion.

In this arrangement, a tapered surface may preferably be formed in the annular recess.

Since, in the ball joint of this construction, the extreme end portion of the lower end of the dust cover is reduced in contact area in comparison with the base portion, the surface pressure upon the extreme end portion is increased in comparison with the base portion, thereby ensuring the desired performance of preventing coming-off of the dust cover and the desired sealing properties without using any other fastening means.

If the tapered surface is formed in the annular recess, the dust cover attachment operation becomes easy. In this case, even if the dust cover is attached in a wrong position, the annular recess and the end flange of the dust cover can be brought into engagement with each other, as the ball stud is swung.

DESCRIPTION OF THE PREFERRED EMBODIMENT

An embodiment of the present invention will be described below with reference to the accompanying drawings.

Ball Joint

Figure 1:
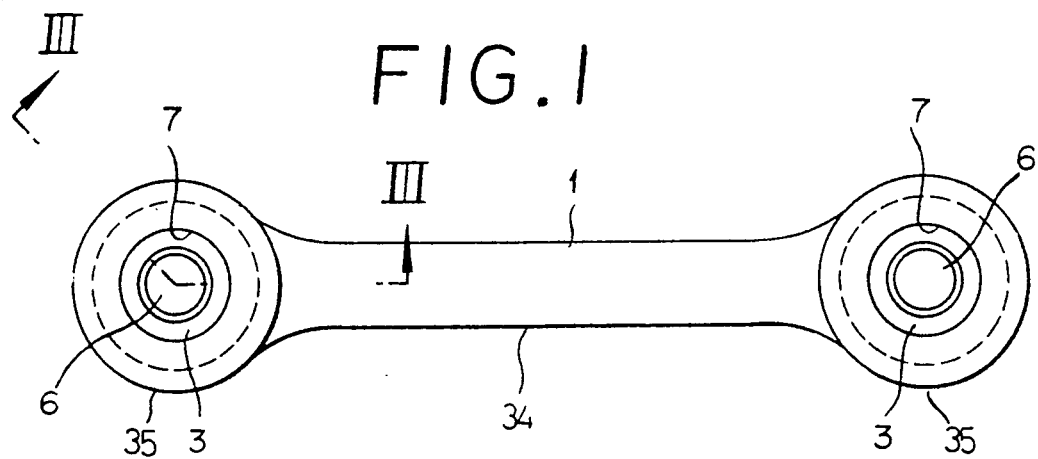
FIG. 1 is a plan view of a ball joint in accordance with the present invention.
Figure 2:
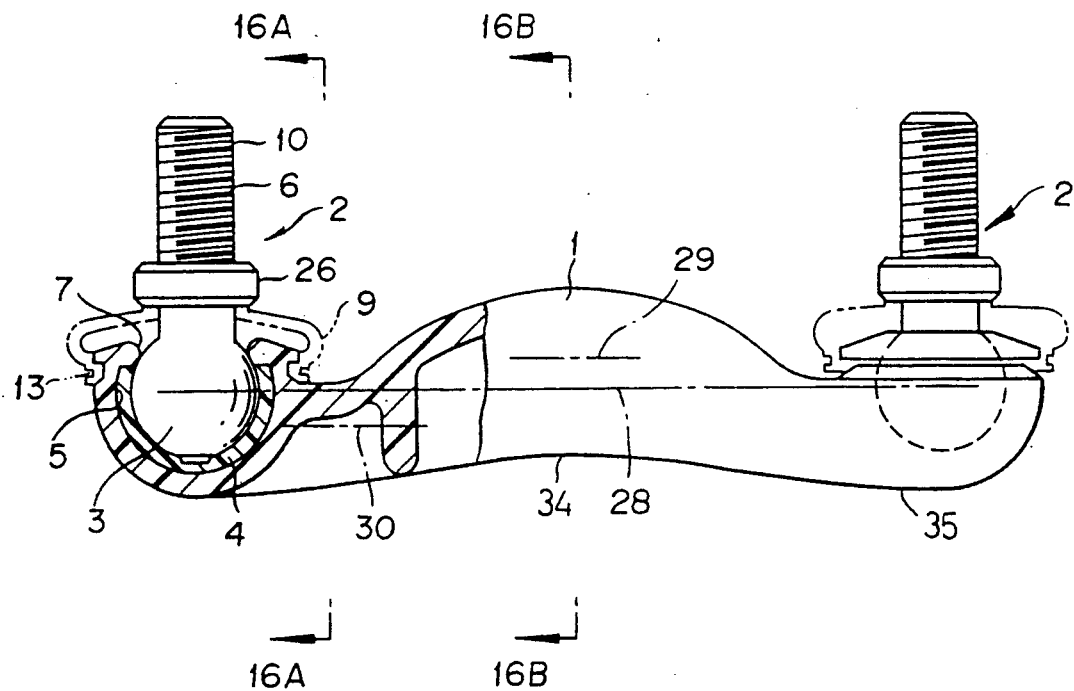
FIG. 2 is a partially sectional side view of the ball joint shown in FIG. 1.
Figure 3:
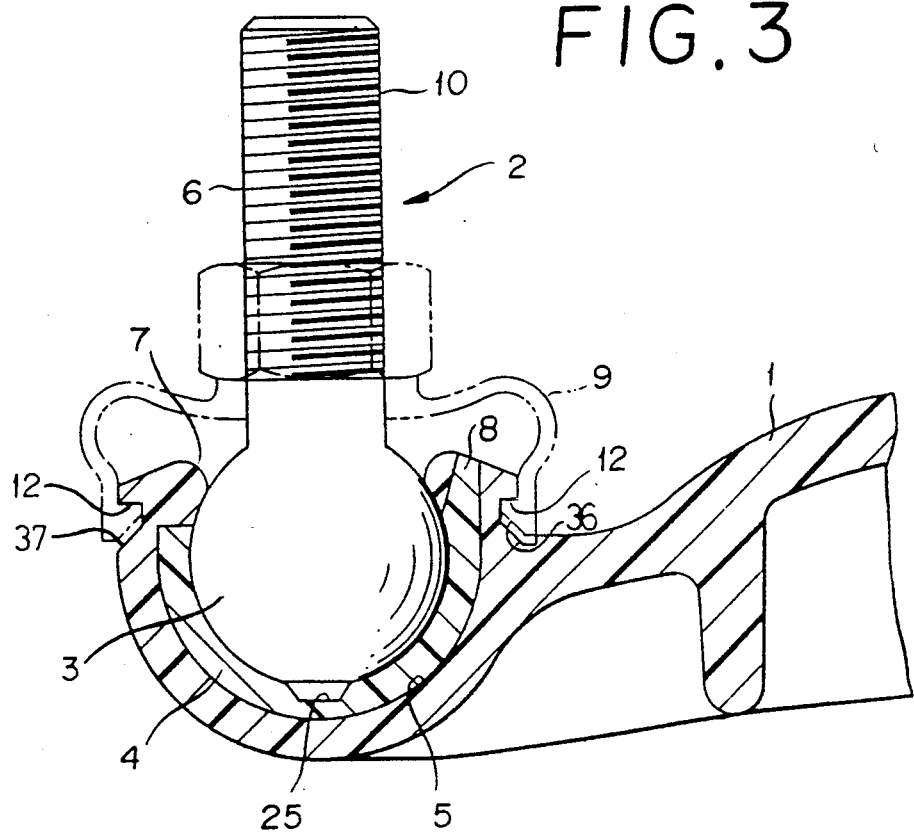
FIG. 3 is a enlarged cross-sectional view taken along the line III—III of FIG. 1.

Referring to FIGS. 1 to 3, a ball joint in accordance with the present invention has ball studs 2, a housing 1 in which the ball studs 2 are housed, and ball seats 4 interposed between the ball studs 2 and the housing 1. Dust covers 9 are attached between shaft portions of the ball studs 2 and the housing 1.

Ball Stud

Each of the ball studs 2 is formed of a metallic material and has a spherical head portion or spherical surface 3 formed at it one end, and a shaft portion 6 formed at the other end and having a screw 10 for connection to a different member. An annular projection 26 for engagement with the dust cover 9 described later is formed on a central portion of each ball stud 2. The shape of the shaft portion 6 is not limited to that shown in FIG. 2 with respect to this example, and can be changed in various ways. For example, the connection means provided at the other end of the shaft portion 6 may be different from the screw 10.

Ball Seat

Each of the ball seats 4 is formed of a polyacetal resin by injection molding. The inner surface of the ball seat 4 has a spherical shape corresponding to the outer peripheral surface of the spherical head portion 3 and is slightly larger than the spherical head portion 3.

Figure 9:
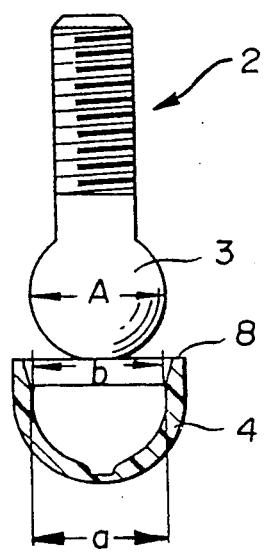
FIGS. 9 and 10 are cross-sectional views of a process of manufacturing the ball joint in accordance with the present invention.
Figure 11:
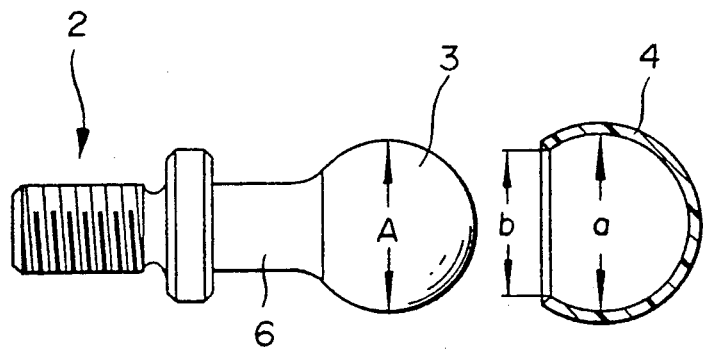
FIGS. 11 and 12 are cross-sectional views of another example of the process of manufacturing the ball joint in accordance with the present invention.

Specifically it is preferable to establish the following relationship between the maximum diameter A of the spherical head portion 3 of the ball stud 2 and the maximum inside diameter a of the ball seat 4 shown in FIG. 9 and 11. That is, in case where the synthetic resin forming the housing is polypropylene, D1=18 mm, and the thickness of the ball seat is 2 mm, $$(a-A) < 1.2 \text{ mm}.$$

However, this value changes depending upon the shrinkage factor of the synthetic resin forming the housing.

The present invention has features shown below.

Figure 4:
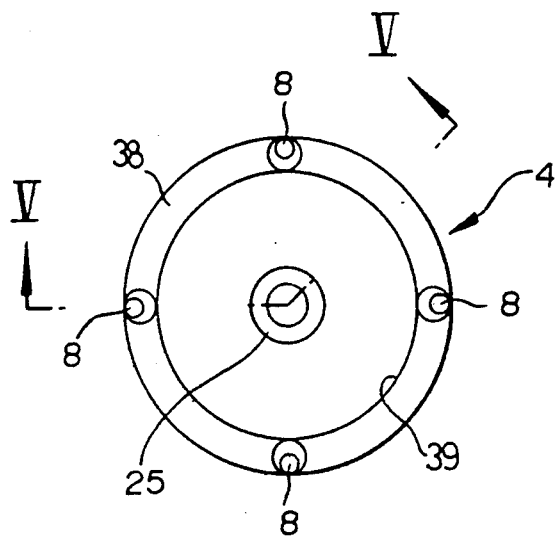
FIG. 4 is a plan view of a ball seat in accordance with the present invention.
Figure 5:
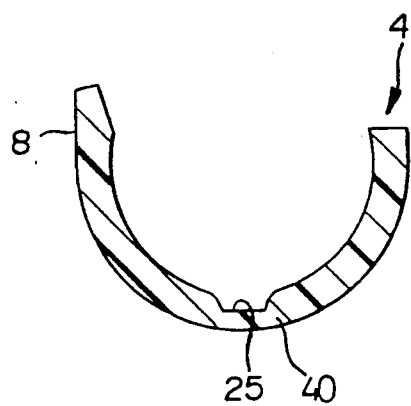
FIG. 5 is a cross-sectional view taken along the line V—V of FIG. 4.

In an example of the ball seat 4 of the present invention shown in FIGS. 3 to 5, engagement portions 8 consisting of four projections are formed integrally with an opening edge portion of the ball seat 4. The shape of each projection 8 is such that the projection 8 abuts against a first die 11a which is used an insert die for the ball stud 2 at the time of molding of the housing 1, as shown in FIG. 10.

Figure 10:
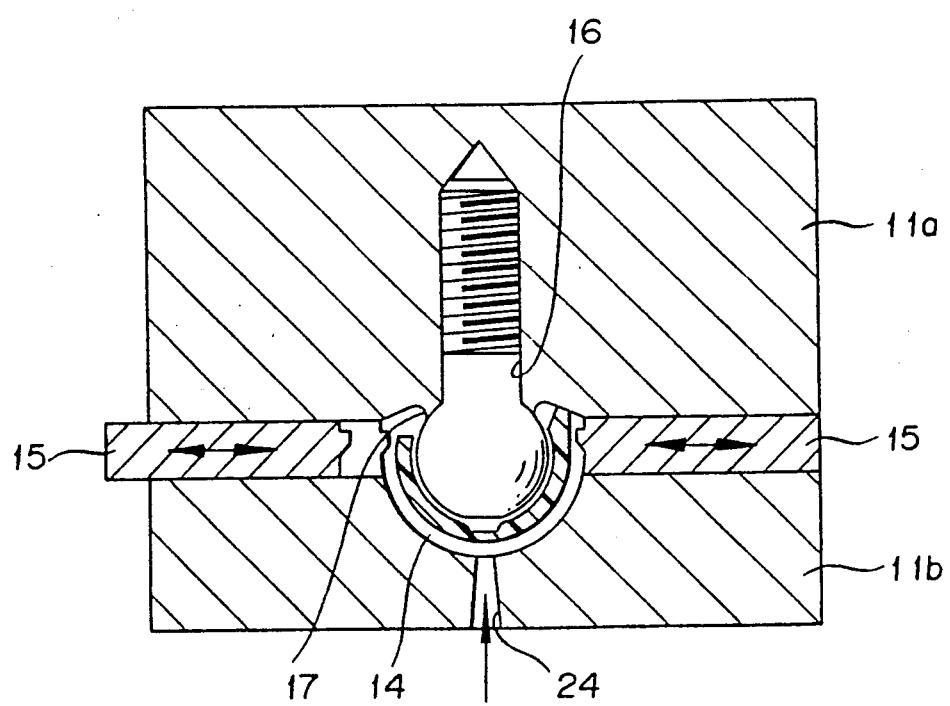

More specifically, the first die 11a in FIG. 10 has a bore 16 formed at it center with a protrusion 17 formed around the opening of the bore 16. The shaft portion 6 and a part of the spherical portion 3 of the ball stud 2 are inserted in the bore 16. When the ball stud 2 is inserted in the first die 11a after the ball seat 4 has been press-fitted to the ball stud 2, the engagement portions 8 formed on the ball seat 4 abut against portions of the first die 11a in the vicinity of the protrusion 17.

Since, as mentioned above, the ball seat 4 previously formed is only set in a loosely fitted state by the press-fitting, the position of the ball seat 4 is not determined relative to the spherical head portion 3 of the ball stud 2. If injection molding for forming the housing 1 is performed under this condition, the ball seat 4 is shifted by the pressure of the injected resin, resulting in failure to insert-mold the ball seat 4 in the desired position. In accordance with this example, to prevent the position of the ball seat 4 from being shifted, the ball seat 4 is positioned on the first die 11a whose position is fixed relative to the ball seat 4 during injection molding.

The engagement portion 8 also has the function of engaging the ball seat 4 with the housing 1 after the molding of the housing 1.

Preferably, the engagement portions 8 are formed at positions such as to be embedded in the synthetic resin forming the housing 1. If the engagement portions are formed so as to be exposed at an opening 7, the tendency of concentration of stress is increased, resulting in occurrence of cracks or breakage. This problem should be noted. In a case where a die construction is adopted in which the engagement portions 8 abut against slide dies 15 to position the ball seat 4, there is a risk of the engagement portions 8 being crushed by the slide dies if the ball seat 4 is inserted while being set in an incorrect position. This problem should also be noted.

The shape of the engagement portions 8 is not limited to that of the above-described example and can be changed in various ways. Other examples of the engagement portions 8 formed on the ball seat 4 are show in half-sectional views of FIGS. 6 to 8.

Figure 6:
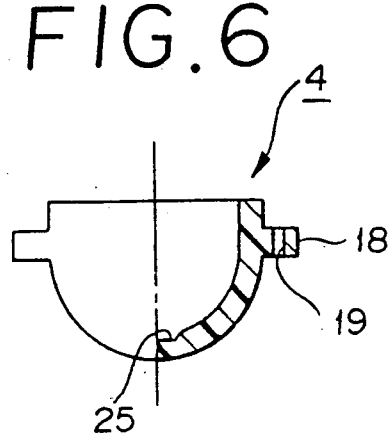
FIGS. 6 to 8 are half-sectional views of other examples of the ball seat.

In another example of the ball seat 4 shown in FIG. 6, the projections of the above-described example are replaced with an annular projection 18 formed on an outer circumferential portion of the ball seat 4 in the vicinity of the opening edge and through holes 19 formed in the annular projection 18. The annular projection 18 has a function of positioning the ball seat 4 by abutting against side dies such as those shown in FIG. 10, and also has a function of engaging the ball seat 4 with the housing after the molding of the housing 1. The projection of this example is not limited to an annular projection; it may be replaced with partial circumferential projections.

Figure 7:
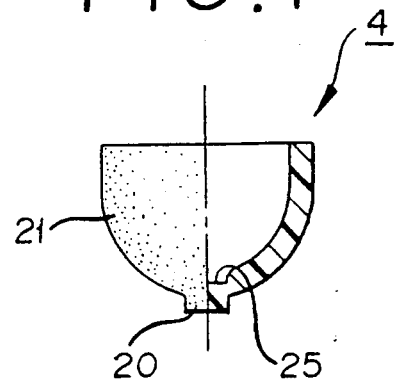

A ball seat 4 shown in FIG. 7 has a projection 20 formed on its bottom wall and capable of being engaged with a second die 11b shown in FIG. 10 to position the ball seat 4 at the time of insertion of the ball stud 2. This ball seat 4 also has irregularities 21 formed its outer surface so as to increase the surface roughness thereof for engagement the housing 1 after the molding.

Figure 8:
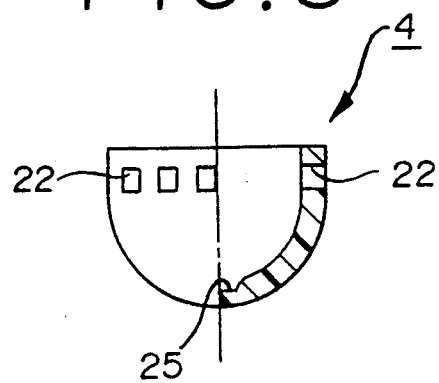

A ball seat 4 shown in FIG. 8 has a plurality of through holes 22 formed in the vicinity of its opening edge. The holes 22 enable the ball seat 4 to be engaged with the housing 1. As in the case of this example, the function of positioning the ball seat 4 at the time of insertion of the balls stud can be removed.

The synthetic resin forming the ball seat 4 is not limited to polyacetal; any elastically shrinkable material can be used instead. Possible examples of the material of the ball seat 4 other than polyacetal (POM) are polyamide (PA), polyethylene (PE), polytetrafluoroethylene (PTE), and so on.

As described above, the ball seat 4 of the present invention is formed so as to be slightly larger than the outer peripheral surface of the spherical head portion 3, thereby solving the problem of a reduction in the facility of assembly encountered when the resistance of the ball stud 2 to the coming-off load acting to disengage the ball stud 2 from the housing 1 is increased in a conventional way. That is, the ball seat 4 can be easily fitted to the spherical head portion 3 because the ball seat 4 is larger than the head portion 3 and is elastic since it is formed of a synthetic resin. When the ball stud 2 to which the ball seat 4 is fitted is set in the housing, the ball seat 4 is compressed by the shrinkage of the housing 1. The desired ball stud 2 coming-off load is maintained based on the housing opening diameter.

Each of the examples of the ball seat 4 shown in FIGS. 3, 6, 7, and 8 has a grease reservoir 25 containing grease which is to be supplied to the gap between the ball seat 4 and the spherical portion 3 at the time of press-fitting of the ball seat 4 to the ball stud 2. This grease enables the ball stud 2 to swing more smoothly. The supply of grease, however, is not essential to the present invention and may be considered according to the use of the ball joint of the present invention.

Housing

Referring to FIG. 3, an inner chamber 5 for housing the ball stud 2 and the ball seat 4 is formed in the housing 1, and the opening 7 is formed continuously with the inner chamber 5 so that the shaft portion 6 of the ball stud 2 can swing. The inner chamber 5 has a function of firmly retaining the spherical head portion 3 slidably on the inner surface of the ball seat 4 by holding the outer surface of the ball seat 4. A composite material composed by mixing an inorganic filler, e.g., glass fiber in polypropylene is suitable for forming the housing 1.

Any other material can be used to form the housing 1 so long as it can be formed by injection molding and ensures the desired strength of the product. For example, polypropylene or polyamide is suitable if the manufacturing cost is important. To improve the strength, a material composed by mixing a filler such as glass fiber in polypropylene or polyamide may be selected.

Assuming that the housing 1 of the ball joint in accordance with the present invention consists of socket portions 31 defined in the vicinity of the inner chambers 5 and a rod portion 32 connecting the socket portions 31 and corresponding to a central portion of the housing 1, the cross-sectional centroid 30 of a portion of the housing 1 at each of the boundaries between the socket portions 31 and the rod portion 32 is set below an axial line 28 connecting the two spherical head portions 3, as viewed in FIG. 2 an in FIG. 16(A), while the cross-sectional centroid 29 of a central portion of the rod portion 32 is set above the axial line 28, as viewed in a corresponding diagram.

Figure 16:
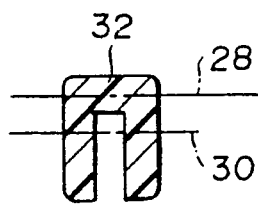
FIGS. 16(A) and 16(B) are cross-sectional views of the housing of the present invention corresponding to the cross sections taken along the line 16A—16A and the line 16B—16B of FIG. 2, respectively.
Figure 16:
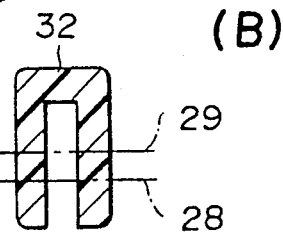
Figure 17:
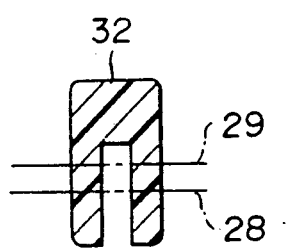
FIGS. 17, 18, and 19 are cross-sectional views of other examples of the housing of the present invention corresponding to the cross-section taken along the line B—B of FIG. 2.
Figure 18:
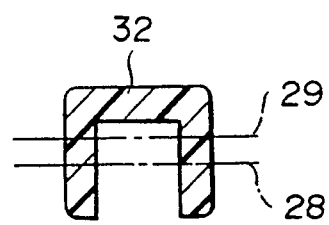
Figure 19:
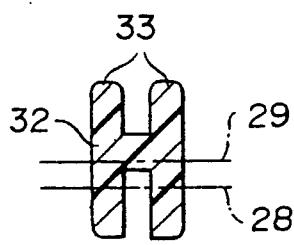
Figure 20:
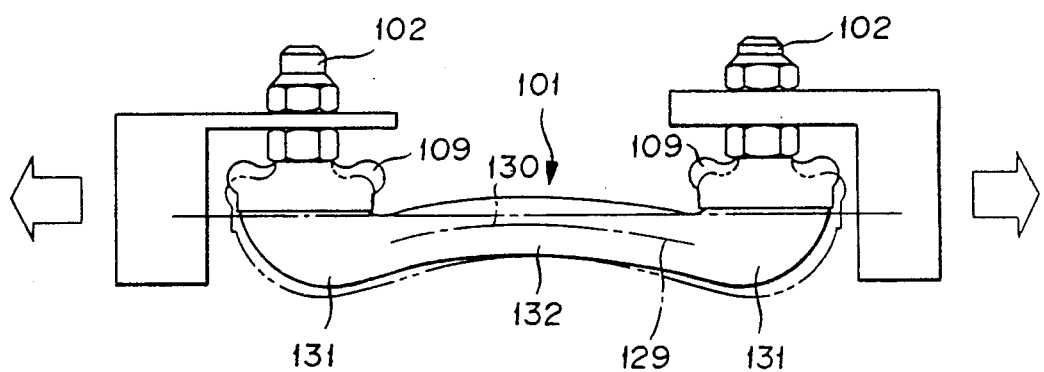
FIG. 20 is a side view of a conventional ball joint.

A construction in which the cross-sectional centroid 29 of the central portion of the rod portion 32 is set above the axial line 28 may be realized by forming the rod portion 32 generally on the upper side of the axial line 28, as shown in FIG. 16(B), or by increasing the thickness of the part of the rod portion 32 located above the axial line 28, as shown in FIG. 17. Such a construction may also be realized by increasing the width of the rod portion 32 alone, as shown in FIG. 18, or forming ribs 33 on the upper side of the axial line 28, as shown in FIG. 19.

Each of these and other various shapes of the housing 1 of the ball joint in accordance with the present invention can be readily formed by selecting dies for forming the housing 1.

If, in the thus-constructed ball joint of the present invention, a tensile force is applied in the direction of the axial line 28 connecting the spherical head portions 3 of the ball stud 2, the direction of a bending moment acting on the rod portion 32 about the center of the housing 1 and the direction of another bending moment acting on a portion of the housing 1 in the vicinity of each of the boundaries between the socket portions 31 and the rod portion 32 are opposite to each other, and all bending moments acting on the housing are therefore balanced, thereby preventing bending of the housing 1.

Dust Cover

Referring to FIG. 2, annular recesses 12 for retaining the dust covers 9 are formed in outer circumferential surfaces of the housing 1, and are fixed at its lower end with a rings 13. Each dust cover 9 serves to prevent water, dust and the like from entering the slide gap between the ball seat 4 and the ball stud 2 through the opening 7 formed in the housing 1. An upper end portion of each dust cover 9 is fitted to the shaft portion 6. In accordance with the present invention, it is possible to remove the ring 13.

Figure 13:
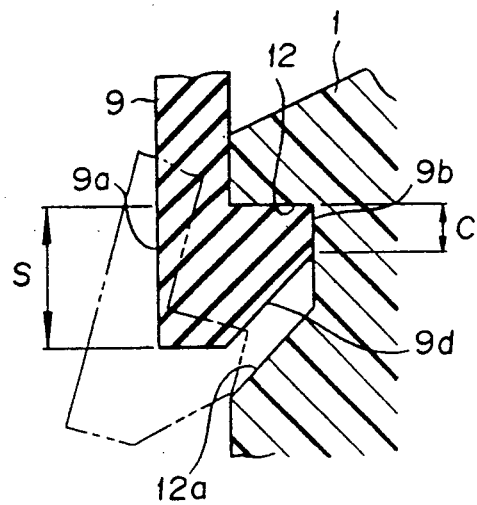
FIG. 13 is an enlarged cross-sectional view of a dust cover in accordance with the present invention.
Figure 14:
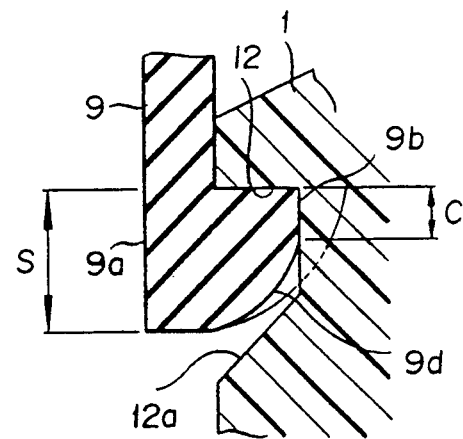
FIGS. 14 and 15 are enlarged cross-sectional views of other examples of the dust cover.
Figure 15:
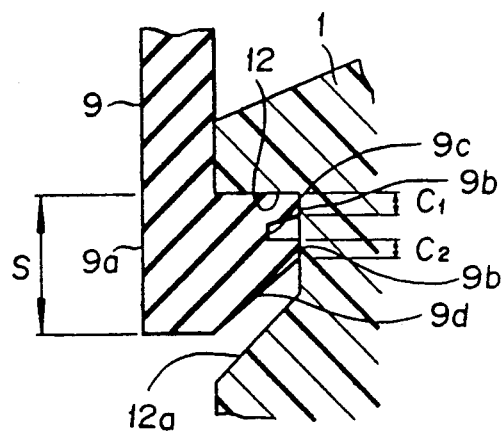

The lower end of each dust cover 9 is formed so that the sectional area of an extreme end portion 9b is smaller than that of a base portion 9a. That is, if the sectional area of the base portion is S, and the sectional area of the extreme end portion 9b is c, as shown the sectional diagram of FIG. 13, a relationship:

$$S > c \tag{1}$$

is established. Consequently, the shape of the lower end of the dust cover 9 is limited to the illustrated example and may of any type so long as in satisfies the equation (1). For example, a curved surface may be formed which extends from the base portion 9a toward the extreme end portion 9b, as shown in FIG. 14. Further, a non-contact surface 9c may be formed in the extreme end portion 9b, as show in FIG. 15. In this case, the sectional area c of the extreme end portion 9b is $c = c_1 + c_2$.

A tapering surface 9d on the curved surface is formed on the side of the dust cover 9 remote from the engaging surface for the purpose of increasing the surface pressure upon the extreme end portion 9b. The provision of this surface also ensures an advantage in that even if the extreme end portion 9b is not correctly positioned to be engaged with the annular recess 12 during the dust cover attachment operation, a taper surface 12a of the housing 1 and the tapering surface 9d of the dust cover 2 slide on each other as the shaft portion 6 of the ball stud 2 is swung, as indicated by the double-dot-dash line in FIG. 13, thereby setting the lower end of the dust cover 9 in the suitable position.

In the thus-constructed ball joint of the present invention, the extreme end portion 9b of the lower end of the dust cover 9 is reduced in contact area in comparison with the base portion 9a, so that the surface pressure upon the extreme end portion 9b is increased in comparison with the base portion 9a, thereby ensuring the desired performance of preventing coming-off of the dust cover 9 and the desired sealing properties without using any other fastening means.

Method of Manufacturing the Ball Joint

A method of manufacturing the above-described ball joint will be described below.

First, grease is supplied to a ball seat 4 previously formed by injection molding or the like, and the ball seat 4 is attached to the spherical head portion 3 of a ball stud 2 by press-fitting, as shown in FIG. 9. At this time, the ball seat 4 can be easily press-fitted since the opening diameter b of the ball seat 4 is approximated to the value determined by $$(A-b)/A = 0.04$$

with respect to the outside diameter A of the spherical head portion 3 of the ball stud 2. This is because the synthetic resin for forming the housing 1 is molded after the attachment of the ball seat 4, and because the performance of preventing the ball stud 2 from coming off can be ensured on this condition.

In addition, since the opening diameter b of the ball seat 4 is approximated to the value determined by $$(a-b)/a = 0.04$$

with respect to the inside diameter a of the ball seat 4, the dies used for molding the ball seat 4 can be easily removed even through an undercut exists.

Next, as shown in FIG. 10, the shaft portion 6 of the ball stud 2 to which the ball seat 4 is attached is inserted in the hole 16 of the first die 11a so that the spherical head portion 3 contacts the protrusion 17, and the first and second dies 11a and 11b are thereafter clamped. Simultaneously, the slide dies 15 which are to be moved to or apart from the ball joint between the dies 11a and 11b are moved to the ball joint. The synthetic resin for forming the housing 1 is injected into a space 14 defined by these dies through a gate 24 formed in the second die 11b.

Figure 12:
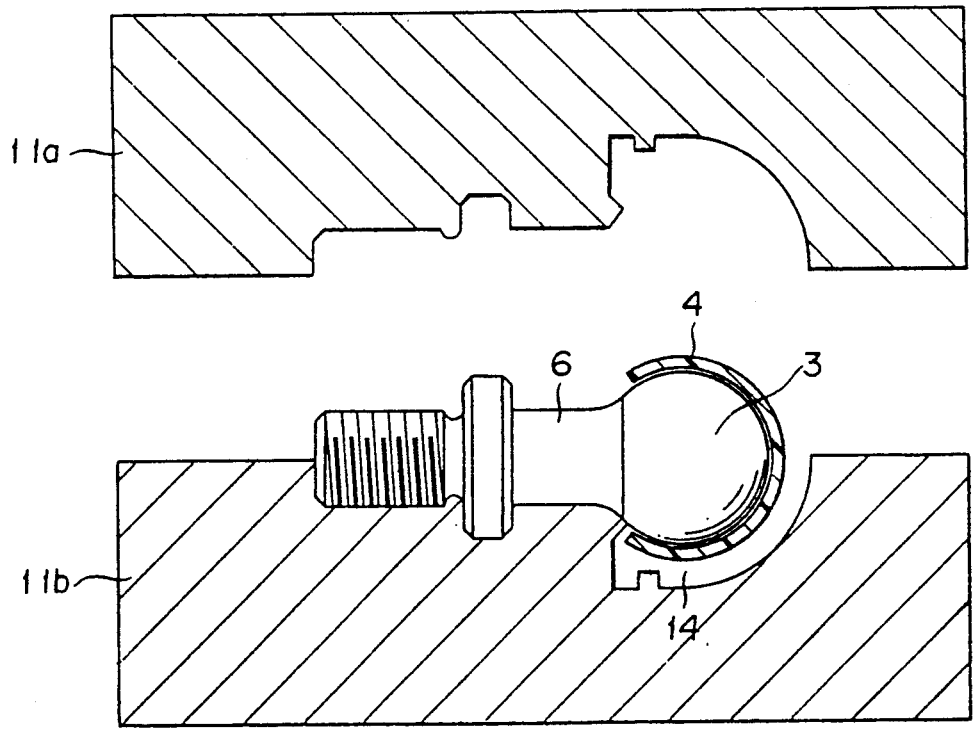

The die arrangement is not limited to that shown in FIG. 10 and can be selected according to the shape of the ball joint and other conditions. Dies such as those shown in FIG. 12 can also be used for molding in accordance with the present invention. In this example, as show in FIG. 11, the ball seat 4 is previously attached to the ball stud 2, ball stud 2 is placed in a predetermined position in a die 11 (lower die 11a) as shown in FIG. 12, and another die 11 (upper die 11b) is thereafter clamped with the lower die 11a, thereby forming a space 14 into which the synthetic resin for forming the housing 1 is injected.

In the above-described construction of the present invention, the thickness of the ball seat 4 is previously selected, the ball seat 4 formed of a synthetic resin material is loosely fitted around the spherical head portion 3 of the ball stud 2, and the ball stud 2 to which the ball seat 4 is attached is set in the dies 11, thereby enabling the housing 1 to be integrally formed by insert molding. During molding of the housing 1, the ball seat 4 can be contracted by being compressed by the synthetic resin for forming the housing 1 so as to have a shape corresponding to the outer peripheral surface of the spherical heat portion 3, and can be fixed by the synthetic resin forming the housing 1, thereby setting the optimum torque of swinging of the ball stud. The facility with which the ball stud 2 is attached is remarkably improved in accordance with the above-described insert molding process, and the desired coming-off load can be set by selecting the housing opening diameter to prevent the ball stud 2 from coming off. It is thereby possible to obtain a ball joint with improved coming-off load and facility of assembly.

The engagement portions 8 formed on the ball seat 4 abut against the die at the time of insert molding to fix the ball seat 4, thereby preventing the ball seat 4 from being shifted from the correct position. After the insert molding, the engagement portions 8 formed on the ball seat 4 engage with the synthetic resin forming the housing 1, thereby firmly fixing the ball seat 4 to the housing 1.

In the above-described embodiment, the present invention is described with respect to the ball joints shown in FIGS. 1 to 2. However, the present invention is not limited to this form and can be applied to various types of ball joints.

In accordance with the present invention, as described above, the ball joint provided by the present invention has a large coming-off load, is improved in rigidity, durability and producibility, is advantageous in terms of cost, and is improved in sealing properties and attachment of the dust cover, while the sliding performance essentially required of the ball joint is maintained.

What is claimed is:

1. A ball joint comprising:

a pair of ball studs (2) each having a spherical head portion (3) formed at its one end and a shaft portion formed at the other end;

a housing (1) formed of a synthetic resin and having inner chambers (5) spaced apart from each other by a predetermined distance, said all studs (2) being housed in said inner chambers (5) so that said shaft portion (6) are swingable; and dust covers (9) attached between said housing (1) and said shaft portions (6);

wherein a ball seat (4) formed of a synthetic resin is provided between each of said spherical head portions (3) and said housing (1) so as to wrap round the outer periphery of said spherical head portion (3) and to be slidable thereon, and the cross-sectional centroid (29) of a central portion of said housing (1) is positioned on the side of said shaft portions (6) of said ball studs (2) with respect to an axial line (28) connecting said two spherical head portions (3, 3), while the cross-sectional centroid (30) of a portion of said housing in the vicinity of each of said inner chambers (5) is positioned on the opposite side from the cross-sectional centroid (29) of the central portion of said housing (1) with respect to the axial line (28) connecting said two spherical head portions (3, 3).

2. A ball joint comprising:

a pair of ball studs (2) each having a spherical head portion (3) formed at its one end and a shaft portion formed at the other end;

a housing (1) formed of a synthetic resin and having inner chambers (5) spaced apart from each other by a predetermined distance, said ball studs (2) being housed in said inner chambers (5) so that said shaft portions (6) are swingable; and dust covers (9) attached between said housing (1) and said shaft portions (6);

wherein a ball seat (4) formed of synthetic resin is provided between each of said spherical head portions (3) and said housing (1) so as to wrap round the outer periphery of said spherical head portion (3) and to be slidable thereon, the cross-sectional centroid (29) of a central portion of said housing (1) is positioned on the side of said shaft portions (6) of said ball studs (2) with respect to an axial line (28) connecting said two spherical head portions (3, 3), while the cross-sectional centroid (30) of a portion of said housing in the vicinity of each of said inner chambers (5) is positioned on the opposite side from the cross-sectional centroid (29) of the central portion of said housing (1) with respect to the axial line (28) connecting said two spherical head portions (3, 3), annular recesses (12) are formed in outer circumferential surfaces of said housing (1), and end flanges of said dust covers (9) are brought into engagement with said annular recesses (12), each of said end flanges having a shape such that the contact area of its extreme end portion is reduced in comparison with its base portion.

3. A ball joint according to any one of claims 1, and 6, wherein engagement means (8) is formed on said ball seat (4), said engagement means (8) being capable of abutting against a member such as a mold (11) fixed relative to said ball stud (2).

4. A ball joint according to claim 3, wherein said engagement means (8) includes a plurality of projections formed on an opening end of said ball seat (4).

5. A ball joint according to claim 2, wherein a taper surface (12a) is a formed in said annular recess (12).

6. A ball joint comprising:
a first ball stud, and a second ball stud, wherein each of said ball studs comprises a spherical head portion and a shaft portion;
a housing formed of synthetic resin, said housing comprising a first head receiving chamber and a second head receiving chamber, wherein said first chamber and said second chamber are each adapted to receive one of said ball studs such that said shaft portion corresponding to said one ball stud is swingable and wherein both of said shaft portions lie on one side of said housing, said housing further comprising a central portion, a first portion in the vicinity of said first chamber and a second portion in the vicinity of said second chamber, said central portion including a cross-sectional centroid positioned on the side of said housing on which both of said shaft portions lie and said first and second portions each including a cross-sectional centroid positioned on the side of said housing opposite to that on which both of said shaft portions lie;
a first dust cover and a second dust cover, wherein the first dust cover is carried by said housing in the vicinity of said first chamber and by said first ball stud, and wherein the second dust cover is carried by said housing in the vicinity of said second chamber and by said second ball stud.

7. The ball joint of claim 6 further comprising:
first open ended ball seat means located in said first chamber and second open ended ball seat means located in said second chamber, wherein said first and second ball seat means are formed of a synthetic resin, and further wherein said first and second ball seat means each slidably embrace substantially all of said spherical head portion of said first and said second ball studs respectively so that said first and second ball studs are swingable.

8. The ball joint of claim 6 further comprising:
a first annular recess formed in the outer surface of said housing in the vicinity of said first chamber;
a second annular recess formed in the outer surface of said housing in the vicinity of said second chamber; and
a tapered flange formed on each of said first dust cover and said second dust cover, wherein said tapered flange tapers from a larger surface area radially outward of said housing to a smaller surface area close to said housing, and further wherein said tapered flange is adapted to engage one of said annular recesses.

9. The ball joint of claim 8 wherein said annular recesses each comprise a sloping surface.

10. The ball joint of claim 6 wherein said first and second ball seat means each comprises engagement means, wherein each said engagement means is adapted to abut against a member such as a mold fixed relative to the ball stud corresponding to the ball seat associated with each said engagement means.

11. The ball joint of claim 10 wherein each said engagement means comprises a plurality of projections formed on said ball seat at the open end of the ball seat associated with each said engagement means.

12. The ball joint of claim 10 wherein said first and second ball seats each comprise an outer circumferential portion and said engagement means comprises an annular projection on the outer circumferential portion of the ball seat associated with each said engagement means and further wherein said annular projection includes a plurality of through holes.

13. The ball joint of claim 12 further comprising:
a first annular recess formed in the outer surface of said housing in the vicinity of said first chamber;
a second annular recess formed in the outer surface of said housing in the vicinity of said second chamber; and
a tapered flange formed on each of said first dust cover and said second dust cover, wherein said tapered flange tapers from a larger surface area radially outward of said housing to a smaller surface area close to said housing, and further wherein said tapered flange is adapted to engage one of said annular recesses.

14. The ball joint of claim 6 further comprising:
first open ended ball seat means located in said first chamber;
second open ended ball seat means located in said second chamber,
wherein said first and second ball seat means are formed of a synthetic resin, and further wherein said first and second ball seat means each slidably embraces substantially all of said spherical head portion of said first and said second ball studs respectively so that said first and second balls studs are swingable;
a first annular recess formed in the outer surface of said housing in the vicinity of said first chamber;
a second annular recess formed in the outer surface of said housing in the vicinity of said second chamber;
a tapered flange formed on each of said first and second dust covers, wherein said tapered flange tapers from a larger surface area radially outward of said housing to a smaller surface area close to said housing, and further wherein said tapered flange is adapted to engage one of said annular recesses; and engagement means on each of said first and second ball seat means, wherein each said engagement means is adapted to abut against a member such as a mold fixed relative to the ball stud corresponding to the ball seat associated with each said engagement means, and further wherein each said engagement means comprises a plurality of projections formed on said ball seat at said open end of the ball seat associated with each said engagement means.

* * * * *